(12) United States Patent
Ichikawa

(10) Patent No.: US 8,818,533 B2
(45) Date of Patent: Aug. 26, 2014

(54) INFORMATION PROCESSING DEVICE, COMMUNICATION SYSTEM, AND INFORMATION PROCESSING METHOD

(75) Inventor: Takeshi Ichikawa, Kanagawa (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 312 days.

(21) Appl. No.: 13/196,939

(22) Filed: Aug. 3, 2011

(65) Prior Publication Data

US 2012/0046761 A1 Feb. 23, 2012

(30) Foreign Application Priority Data

Aug. 23, 2010 (JP) .................................. 2010-186698

(51) Int. Cl.
*G05B 15/02* (2006.01)
*G05B 11/01* (2006.01)

(52) U.S. Cl.
USPC ............................................. 700/24; 700/11

(58) Field of Classification Search
USPC ............ 700/11, 12, 14, 23, 24; 709/203, 223; 370/349, 389; 320/127, 137
See application file for complete search history.

(56) References Cited

U.S. PATENT DOCUMENTS

| | | | | |
|---|---|---|---|---|
| 5,859,848 A * | 1/1999 | Miura et al. | ............. | 370/395.31 |
| 6,111,883 A * | 8/2000 | Terada et al. | ................... | 370/401 |
| 6,157,614 A * | 12/2000 | Pasternak et al. | ............. | 370/236 |
| 6,366,582 B1 * | 4/2002 | Nishikado et al. | ............. | 370/401 |
| 6,407,992 B1 * | 6/2002 | Pasternak et al. | ............. | 370/338 |
| 6,714,559 B1 * | 3/2004 | Meier | ............. | 370/449 |
| 6,877,043 B2 * | 4/2005 | Mallory et al. | ................ | 709/251 |
| 6,970,940 B1 * | 11/2005 | Vogel et al. | ..................... | 709/236 |
| 7,224,685 B2 * | 5/2007 | Proctor, Jr. | ..................... | 370/349 |
| 7,386,002 B2 * | 6/2008 | Meier | ............. | 370/449 |
| 7,535,921 B2 * | 5/2009 | Meier | ............. | 370/449 |
| 7,545,816 B1 * | 6/2009 | Coutts et al. | .................. | 370/400 |
| 7,689,697 B2 * | 3/2010 | Chiba | ............. | 709/227 |
| 7,720,981 B2 * | 5/2010 | Nomura et al. | ................ | 709/229 |
| 7,970,013 B2 * | 6/2011 | Sinha et al. | ................... | 370/470 |
| 7,991,351 B2 * | 8/2011 | Kuban | ............................ | 455/7 |
| 8,218,567 B2 * | 7/2012 | Powell | ......................... | 370/463 |
| 8,230,488 B2 * | 7/2012 | Chiba et al. | ........................ | 726/7 |
| 8,301,691 B2 * | 10/2012 | Chiba et al. | .................... | 709/203 |
| 2003/0177215 A1 * | 9/2003 | Sutherland et al. | ........... | 709/223 |
| 2003/0177216 A1 * | 9/2003 | Sutherland et al. | ........... | 709/223 |
| 2006/0112191 A1 * | 5/2006 | Ooi | ................................ | 709/248 |
| 2007/0250632 A1 * | 10/2007 | Nomura et al. | ................ | 709/227 |
| 2007/0255809 A1 * | 11/2007 | Chiba | ............................ | 709/219 |
| 2007/0256118 A1 * | 11/2007 | Nomura et al. | ................... | 726/3 |
| 2008/0034097 A1 * | 2/2008 | Nomura et al. | ................ | 709/227 |

(Continued)

FOREIGN PATENT DOCUMENTS

| | | |
|---|---|---|
| JP | 2001-306487 A | 11/2001 |
| JP | 2006-108850 A | 4/2006 |
| JP | 2008032909 A | 2/2008 |

*Primary Examiner* — Charles Kasenge
(74) *Attorney, Agent, or Firm* — Rabin & Berdo, P.C.

(57) ABSTRACT

An information processing device includes: a receiving unit that receives information to be processed that includes valid data, that has processing content information and identification information, and start information; and a control unit that controls an apparatus such that an initial processing is executed on the basis of the processing content information, and, if the identification information is included in the information to be processed, controls the apparatus such that processing that follows the initial processing is executed, and, if the identification information is not included in the information to be processed, controls the apparatus such that the processing that follows the initial processing is not executed.

17 Claims, 9 Drawing Sheets

(56) References Cited

U.S. PATENT DOCUMENTS

| | | | |
|---|---|---|---|
| 2008/0043732 A1* | 2/2008 | Desai et al. | 370/389 |
| 2008/0057913 A1* | 3/2008 | Sinha et al. | 455/414.1 |
| 2008/0080496 A1* | 4/2008 | Slaight | 370/389 |
| 2008/0225841 A1* | 9/2008 | Conway et al. | 370/389 |
| 2008/0225881 A1* | 9/2008 | Powell | 370/463 |
| 2008/0274689 A1* | 11/2008 | Kuban | 455/7 |
| 2009/0178128 A1* | 7/2009 | Chiba et al. | 726/7 |
| 2009/0248797 A1* | 10/2009 | Chiba et al. | 709/203 |

* cited by examiner

INFORMATION PROCESSING DEVICE, COMMUNICATION SYSTEM, AND INFORMATION PROCESSING METHOD

CROSS-REFERENCE TO RELATED APPLICATIONS

This application is based on and claims priority under 35 USC 119 from Japanese Patent Application No. 2010-186698 filed on Aug. 23, 2010, the disclosure of which is incorporated by reference herein.

BACKGROUND OF THE INVENTION

1. Field of the Invention

The present invention relates to an information processing device, a communication system, and an information processing method. In particular, the present invention relates to an information processing device having a receiving unit that receives information for causing an apparatus to execute a predetermined processing, and a communication system, and an information processing method.

2. Description of the Related Art

As a conventional communication system, there is known a communication system having: a transmitting device that wirelessly transmits a request signal requesting execution of a predetermined processing with respect to an apparatus; and a receiving device that is provided at the apparatus that is the transmission destination of the transmitting device, and that receives the request signal transmitted from the transmitting device, and that causes the apparatus to execute the predetermined processing in accordance with the received request signal (see, for example, Japanese Patent Application Laid-Open (JP-A) No. 2006-108850). In this communication system, the transmitting device and the receiving device are synchronized, and, when the receiving device receives the entire request signal transmitted from the transmitted device, the receiving device notifies the apparatus that reception is completed. The apparatus receives this notification and executes the predetermined processing.

A structural example of an illuminating system 100 to which the conventional communication system is applied is shown in FIG. 1. As shown in FIG. 1, the illuminating system 100 has: an illuminating device 102 that, when a photograph is being taken, illuminates supplementary light onto a subject as needed; and an illumination instructing device 104 that, by using wireless communication, instructs the illuminating device 102 to illuminate supplementary light.

The illuminating device 102 is structured to include: a flash device 106 that emits supplementary light in accordance with an inputted instruction; a communication device 108 that carries out wireless communication with the illumination instructing device 104 via a communication network; and a control device 110 that controls the illuminating device 102 overall. The flash device 106 and the communication device 108 are connected to the control device 110. Accordingly, the control device 110 can respectively carry out access to the flash device 106 and the communication device 108, and control of the flash device 106 and the communication device 108.

The illumination instructing device 104 is structured to include: a switch 112 that is operated on when the illuminating device 102 is to be instructed to illuminate supplementary light; a communication device 114 that carries out wireless communication with the illuminating device 102 via a communication network; and a control device 116 that controls the illumination instructing device 104 overall. The switch 112 and the communication device 114 are connected to the control device 116. Accordingly, the control device 116 can respectively carry out grasping of whether or not the switch 112 has been operated on, access to the communication device 114, and control of the communication device 114.

When the switch 112 is operated on, the illumination instructing device 104 that is structured in this way generates information to be processed that is to be processed at the illuminating device 102 and that is digital data that includes illumination instruction information that instructs the illuminating device 102 to illuminate supplementary light. The illumination instructing device 104 wirelessly transmits the generated information to be processed to the illuminating device 102. Note that the aforementioned "instruction to illuminate supplementary light" includes an instruction to start charging, an instruction to stop charging, and an instruction to start illumination of the supplementary light (an instruction to discharge), with respect to the flash device 106.

An example of the information to be processed that is wirelessly transmitted from the illumination instructing device 104 to the illuminating device 102 is shown in FIG. 2. As shown in FIG. 2, the information to be processed is formed from digital data that is stored in a frame for serial transmission (e.g., an IEEE 802.3 frame), and is structured by digital data that are a preamble, an SFD (Start Frame Delimiter), data length, an address, illumination instruction information, and a CRC (Cyclic Redundancy Check) being lined-up in series from the head to the tail of the frame.

The preamble is a synchronization code that is added to the start of the information to be processed, and is a bit string that is used in order to calibrate the device that is used in wirelessly receiving the information to be processed and in demodulating the information to be processed that is obtained by wireless reception. The SFD is an identifying bit string for enabling identification of the end of the preamble, and is a bit string expressing that the data that follows thereafter is the valid data (the data length, the address, the illumination instruction information and the CRC) among the information to be processed. The data length is a parameter expressing the range (length) of the valid data, i.e., the data among the information to be processed other than the preamble and the SFD. The address is the MAC address that is uniquely assigned to the illumination instructing device 102 serving as the sender, and the MAC address that serves as identifying information that is uniquely assigned to the illuminating device 102 serving as the recipient. The CRC is a code for detecting errors in the valid data.

A structural example of the communication device 108 is shown in FIG. 3. Although the communication device 114 also is structured similarly, here, the communication device 108 is described as an example. As shown in FIG. 3, the communication device 108 is structured to include a control circuit 118, a modulator 120, a demodulator 122, an RF (Radio Frequency) device 124, and an interface circuit 126.

The control circuit 118 controls the communication device 108 overall. The modulator 120 modulates the data that is inputted from the previous stage, and outputs the modulated data to the following stage. The demodulator 122 converts inputted analog data into digital data, and outputs the digital data. The RF device 124 is set in a transmittable state, a receivable state, or a stopped state in accordance with an inputted instruction. In the transmittable state, the RF device 124 converts inputted digital data into RF signals, and transmits the signals from an antenna. In the receivable state, the RF device 124 converts RF signals received at the antenna into analog signals, and outputs the analog signals. Further, the interface circuit 126 is for carrying out transmission and receipt of information between the control device 110 and the control circuit 118.

The modulator 120, the demodulator 122 and the control circuit 118 are connected to the RF device 124. The control circuit 118 is connected to the modulator 120 and the demodulator 122. The control device 110 and the control circuit 118 are connected to the interface circuit 126. Accordingly, the control circuit 118 can respectively carry out receipt of data outputted from the RF device 124 via the demodulator 122, control of the RF device 124, transmission of data to the RF device 124 via the modulator 120, and transmission and receipt of information with the control device 110 via the interface circuit 126.

A structural example of the control circuit 118 is shown in FIG. 9. As shown in FIG. 9, the control circuit 118 is structured to include a detection circuit 118A, an RX_FIFO 118B, and a transmission control circuit 118C. The detection circuit 118A is connected to the demodulator 122 and the interface circuit 126. The RX_FIFO 118B is connected to the detection circuit 118A, the demodulator 122 and the interface circuit 126. The transmission control circuit 118C is connected to the modulator 120, the RF device 124 and the interface circuit 126.

The detection circuit 118A detects the preamble, the SFD and the data length that are included in the information to be processed that is inputted from the RF device 124 via the demodulator 122, and outputs the detection results to the RF_FIFO 118B, and outputs the detection results also to the control device 110 via the interface circuit 126.

The RF_FIFO 118B is a memory that stores data, and that outputs stored data in accordance with an inputted request signal. When detection of the data length by the detection circuit 118A is started, the RF_FIFO 118B starts storing the information to be processed that is inputted from the RF device 124 via the demodulator 122. When detection of the data length by the detection circuit 118A is completed, the RF_FIFO 118B stops storage of the information to be processed, and, in accordance with a request signal inputted from the control device 110 via the interface circuit 126, outputs the stored information to be processed to the control device 110 via the interface circuit 126.

In accordance with an instruction from the control device 110 via the interface circuit 126, the transmission control circuit 118C outputs, to the RF device 124, a control signal that controls the RF device 124, and manipulates data inputted from the control device 110 via the interface circuit 126, and wirelessly transmits the manipulated data to the RF device 124 by outputting the data to the RF device 124 via the modulator 120.

Transitions of the state of the illuminating system 100 are shown in FIG. 10. As shown in FIG. 10, at the illumination instructing device 104, when the switch 112 is operated on (switch on), the control device 116 generates information to be processed, and outputs, to the communication device 114, the generated information to be processed and an RF start-up instruction signal that instructs start-up of the RF device 124. In response to the RF start-up instruction signal inputted from the control device 116, the communication device 114 starts-up the RF device 124 and sets the RF device 124 in the transmittable state. Thereafter, the communication device 114 wirelessly transmits, to the illuminating device 102, the information to be processed that has been inputted from the control device 116 (data transmission). Then, when the wireless transmission of the information to be processed is completed, the communication device 114 shifts the RF device 124 from the transmittable state to the receivable state.

At the illuminating device 102, when the power is turned on (not shown), a standby command is issued from the control device 110 to the communication device 108. In accordance with the standby command inputted from the control device 110, the communication device 108 starts-up the RF device 124 and sets the RF device 124 in the receivable state. Thereafter, the communication device 108 awaits receipt of the information to be processed that is to be transmitted from the illumination instructing device 104. When transmission of the information to be processed from the illumination instructing device 104 is started, the communication device 108 continues to receive the information to be processed until the transmission of the information to be processed is completed. The communication device 108 stores the received information to be processed in the RX_FIFO 118B. Then, when receipt of the information to be processed is completed, the communication device 108 shifts the RF device 124 from the receivable state to the transmittable state, and starts wireless transmission, to the illumination instructing device 104, of an Ack response packet that expresses that data receipt has been competed normally. When the wireless transmission of the Ack response packet is completed, the communication device 108 shifts the RF device 124 from the transmittable state to the stopped state.

When transmission of the Ack response packet from the illuminating device 102 is started, the communication device 114 of the illumination instructing device 104 continues to receive the Ack response packet until transmission of the Ack response packet is completed. Then, when receipt of the Ack response packet is completed, the communication device 114 shifts the RF device 124 from the receivable state to the stopped state, and thereafter, outputs, to the control device 116, a transmission completion notification signal that gives notice that transmission to the illuminating device 102 of the information to be processed has been completed. The control device 116 receives the transmission completion notification signal inputted from the communication device 114.

After the communication device 108 shifts the RF device 124 from the transmittable state to the stopped state, the communication device 108 outputs, to the control device 110, a receipt completion notification signal that gives notice that receipt of the information to be processed has been completed. In response to the receipt completion notification signal inputted from the communication device 108, the control device 110 outputs a request signal to the communication device 108. In response to the request signal inputted from the control device 110, the communication device 108 transfers, to the control device 110, the information to be processed that has been already received. The control device 110 analyzes the information to be processed that has been inputted from the communication device 108, and judges whether or not the address of the information to be processed and its own address match. If the addresses match, the control device 110 instructs the flash device 106 to start charging. The flash device 106 receives the instruction to start charging from the control device 110, and starts charging. When a predetermined time period (e.g., the time period for the charged amount to reach a predetermined amount) has passed from the giving of the instruction to the flash device 106 to start charging, the control device 110 instructs the flash device 106 to stop charging, and causes the flash device 106 to start illumination of supplementary light.

However, in the illuminating system 100, the illuminating device 102 cannot illuminate supplementary light until after all of the information to be processed, that is transmitted from the illumination instructing device 104, has been received. Therefore, the illuminating system 100 cannot be applied to cases in which a rapid response is required, such as in cases in which supplementary light is illuminated when taking photos. Note that a rapid response is also required of liquid crystal shutter glasses that are used when viewing stereoscopic video, to which attention is being given recently. Thus, application of the communication system that is applied to the illuminating system 100 is difficult.

Generally, in apparatuses in which synchronization is needed at times of transmission and receipt and in which a rapid response is required, such as the illuminating device 102 of the illuminating system 100 or liquid crystal shutter glasses or the like, improvement in the amount of information that is processed per unit time (called "throughput" hereinafter) is needed.

The technique disclosed in JP-A No. 2001-306487 is known as a technique for improving throughput. This technique discloses a computer that gives notice of interruption of transmission of data from a transmitting-side processor unit to a receiving-side processor unit that has a data processing mechanism. When the receiving-side processor unit receives an interruption signal transmitted from the transmitting-side processor unit, the receiving-side processor unit starts-up the data processing mechanism. When the receiving-side processor unit receives a data transmission end notification signal that is transmitted from the transmitting-side processor unit, processing of data transmitted from the transmitting-side processor unit is started by the data processing mechanism. In accordance with this technique, because processing of data can be started before data transmission is completed, high throughput can be realized as compared with a conventional communication system.

However, in the technique of JP-A No. 2001-306487, the interruption signal must be transmitted from the transmitting-side processor unit to the receiving-side processor unit separately from the data that is to be processed. Therefore, other planned processings thereafter are delayed by an amount corresponding to the time required for executing the processing for generating and transmitting and receiving the interruption signal.

SUMMARY OF THE INVENTION

The present invention provides an information processing device, a communication system, and an information processing method.

In accordance with an aspect of the present invention, there is provided an information processing device which includes: a receiving unit that receives information to be processed that includes valid data, the valid data having processing content information expressing contents of processing to be executed by an apparatus and identification information identifying the apparatus, and that includes start information that is disposed in front of the valid data and indicates a start of the valid data; and a control unit that, when the start information is received during receipt of the information to be processed by the receiving unit, controls the apparatus such that an initial processing of a time of executing the processing is executed on the basis of the processing content information, and, if the identification information is included in the information to be processed that is received by the receiving unit, controls the apparatus such that processing that follows the initial processing of the time of executing the processing is executed, and, if the identification information is not included in the information to be processed that is received by the receiving unit, controls the apparatus such that the processing that follows the initial processing is not executed.

In accordance with another aspect of the present invention, there is provided an information processing device which includes: a receiving unit that receives information to be processed that includes valid data, the valid data having processing content information expressing contents of processing to be executed by an apparatus and identification information identifying the apparatus, and that includes start information that is disposed in front of the valid data and indicates a start of the valid data, and that includes error detection information that is for detecting errors of the valid data; and a control unit that, when the start information is received during receipt of the information to be processed by the receiving unit, controls the apparatus such that an initial processing of a time of executing the processing is executed on the basis of the processing content information, and, if both an identification condition, which is that the identification information is included in the information to be processed that is received by the receiving unit, and an error condition, which is that errors are not detected from the error detection information, are satisfied, controls the apparatus such that processing that follows the initial processing of the time of executing the processing is executed, and, if at least one of the identification condition and the error condition is not satisfied, controls the apparatus such that the processing that follows the initial processing is not executed.

In accordance with another aspect of the present invention, there is provided an information processing method which includes: receiving, by a receiving unit, information to be processed that includes valid data, the valid data having processing content information expressing contents of processing to be executed by an apparatus and identification information identifying the apparatus, and that includes start information that is disposed in front of the valid data and indicates a start of the valid data; when the start information is received during receipt of the information to be processed, controlling the apparatus such that an initial processing of a time of executing the processing is executed on the basis of the processing content information; if the identification information is included in the received information to be processed, controlling the apparatus such that processing that follows the initial processing of the time of executing the processing is executed; and if the identification information is not included in the received information to be processed, controlling the apparatus such that the processing that follows the initial processing is not executed.

BRIEF DESCRIPTION OF THE DRAWINGS

Preferred embodiments of the present invention will be described in detail based on the following figures wherein.

DETAILED DESCRIPTION OF THE INVENTION

Figure 2:
FIG. 2 is a schematic drawing showing an example of the structure of information to be processed that is transmitted and received by wireless communication of the illuminating systems relating to the exemplary embodiments.
Figure 3:
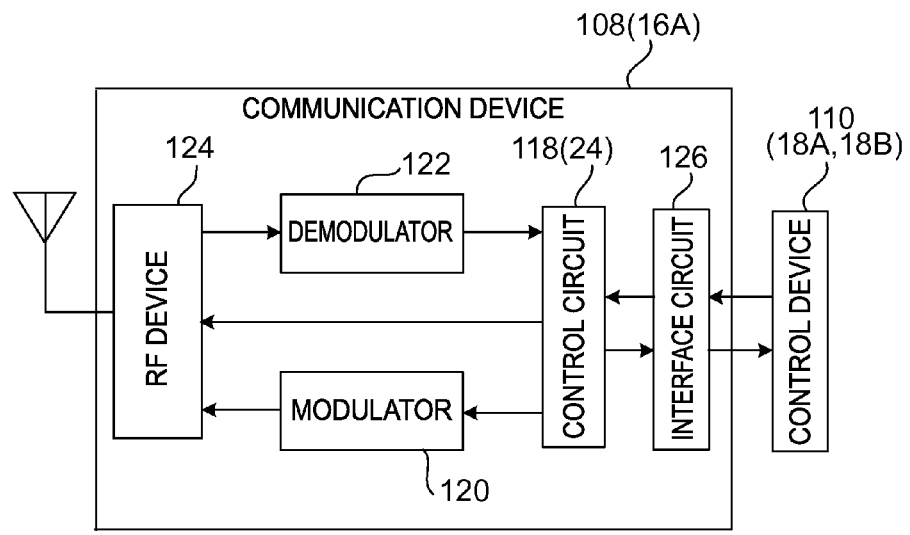
FIG. 3 is a block diagram showing main structures of a communication device of an illuminating system relating to a first exemplary embodiment, and main structures of a communication device relating to the conventional illuminating system.

Examples of forms for embodying the present invention are described in detail hereinafter with reference to the drawings. Note that, in the exemplary embodiments, portions that are the same as in the illuminating system 100 shown in FIG. 1 and the communicating device 108 shown in FIG. 3 are denoted by the same reference numerals and description thereof is omitted. In the present exemplary embodiments as well, the information to be processed that is shown in FIG. 2 is used, and therefore, description thereof is omitted.

First Exemplary Embodiment

Figure 1:
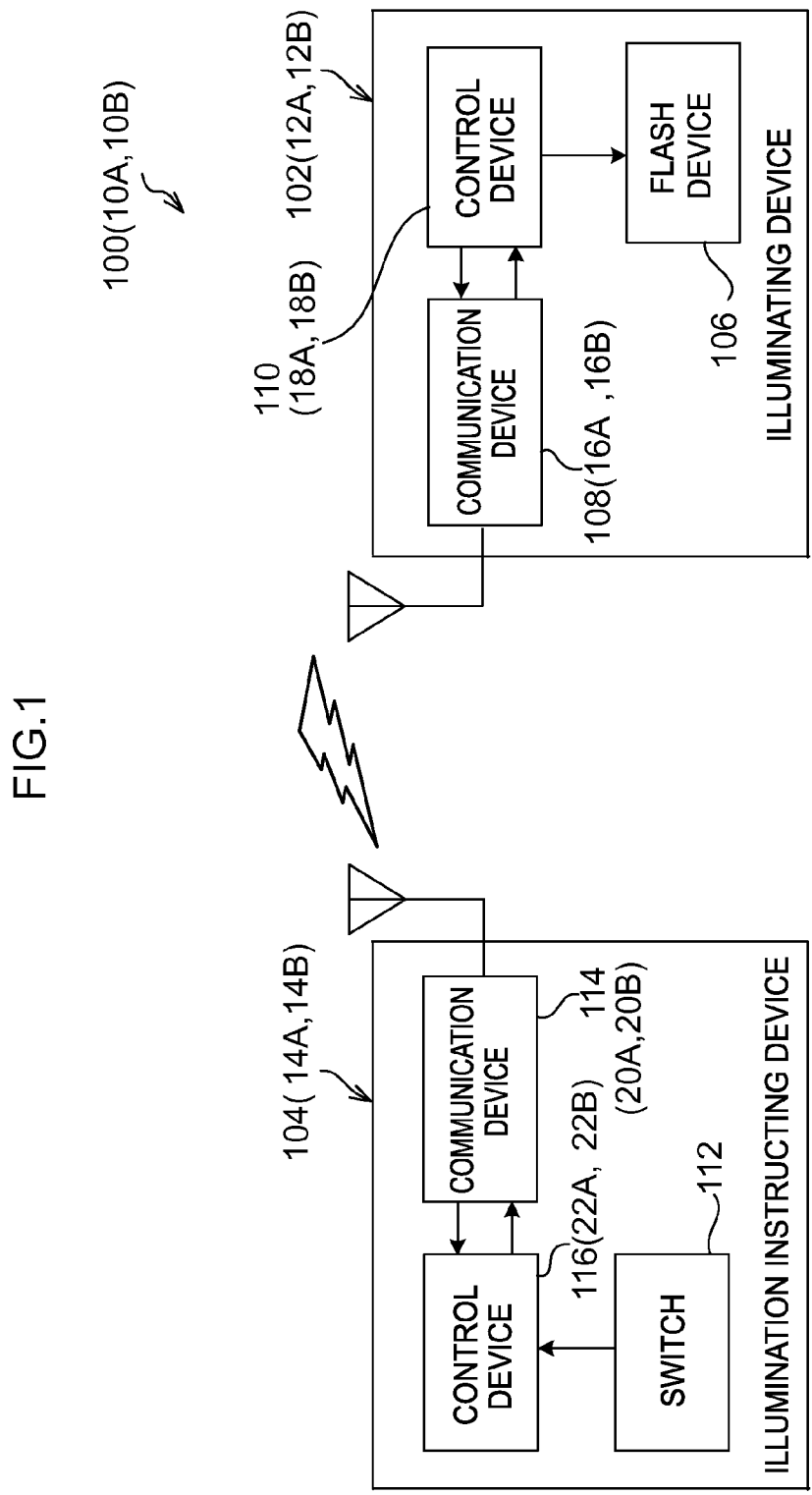
FIG. 1 is a structural drawing showing an example of the structure of illuminating systems relating to exemplary embodiments, and an example of the structure of a conventional illuminating system.

FIG. 1 is a schematic drawing showing an example of the structure of an illuminating system 10A relating to the present first exemplary embodiment. As shown in FIG. 1, the illuminating system 10A has: an illuminating device 12A that, when a photograph is being taken, illuminates supplementary light onto a subject as needed; and an illumination instructing device 14A that, by using wireless communication, instructs the illuminating device 12A to illuminate supplementary light. Note that, in the illuminating system 10A relating to the present first exemplary embodiment, communication in accordance with IEEE 802.15.4 (ZigBee) is used, but the present invention is not limited to the same, and IrDA, Bluetooth™, or wireless LAN may be used.

The illuminating device 12A is structured to include: the flash device 106; a communication device 16A that carries out wireless communication with the illumination instructing device 14A via a communication network; and a control device 18A that controls the illuminating device 12A overall. The communication device 16A and the flash device 106 are connected to the control device 18A. Accordingly, the control device 18A can respectively carry out access to the communication device 16A and the flash device 106, and control of the communication device 16A and the flash device 106.

The illumination instructing device 14A is structured to include: the switch 112 that is operated on when the illuminating device 12A is to be instructed to illuminate supplementary light (e.g., a push-button switch that can be switched from off to on while being pushed and operated); a communication device 20A that carries out wireless communication with the illuminating device 12A via a communication network; and a control device 22A that controls the illumination instructing device 14A overall. The communication device 20A and the switch 112 are connected to the control device 22A. Accordingly, the control device 22A can respectively carry out grasping of whether or not the switch 112 has been operated on, access to the communication device 20A, and control of the communication device 20A.

When the switch 112 is operated on, the illumination instructing device 14A that is structured in this way generates information to be processed that is to be processed at the illuminating device 12A and that is data that includes illumination instruction information that instructs the illuminating device 12A to illuminate supplementary light. The illumination instructing device 14A wirelessly transmits the generated information to be processed to the illuminating device 102. Note that the structure of the information to be processed is as shown in FIG. 2 as described above.

A structural example of the communication device 16A is shown in FIG. 3. Note that, although the communication device 20A of the illumination instructing device 14A is also structured similarly, here, the communication device 16A is described as an example. As shown in FIG. 3, the communication device 16A differs from the communication device 108 of the illuminating device 102 in the illuminating system 100 only with regard to the point that the communication device 16A has a control circuit 24 instead of the control circuit 118. Note that the control circuit 24 controls the communication device 16A overall.

Figure 4:
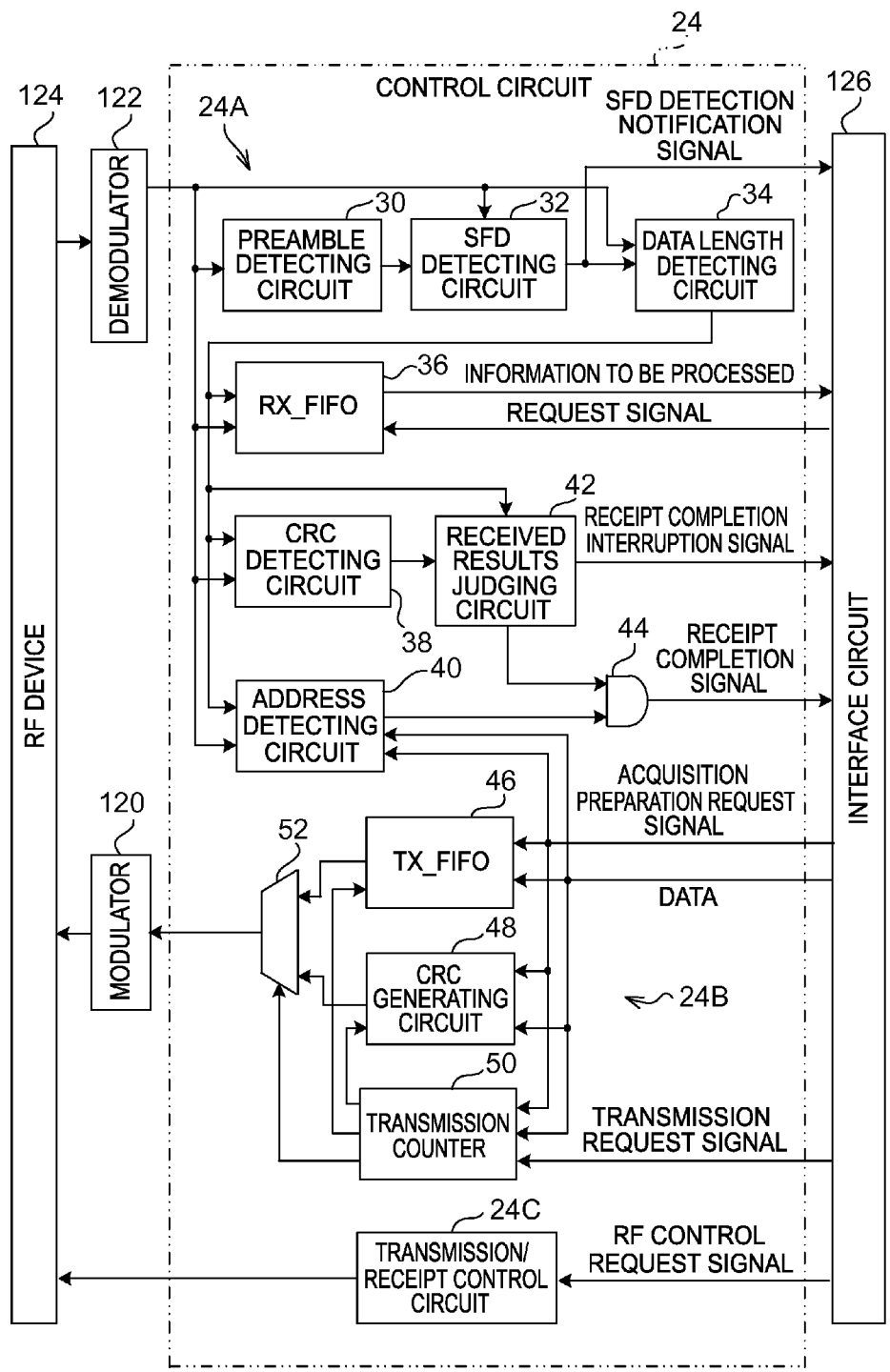
FIG. 4 is a block diagram showing main structures of a control circuit of the communication device at the illuminating system relating to the first exemplary embodiment.

FIG. 4 is a structural drawing showing an example of the structure of the control circuit 24 of the communication device 16A in the illuminating system 10A relating to the present first exemplary embodiment. As shown in FIG. 4, the control circuit 24 is structured to include a receiving system circuit 24A, a transmitting system circuit 24B and a transmission/receipt control circuit 24C.

The receiving system circuit 24A is a circuit for acquiring the information to be processed that is received by the RF device 124, and transferring the acquired information to be processed to the following stage. The receiving system circuit 24A is structured to include a preamble detecting circuit 30, an SFD detecting circuit 32, a data length detecting circuit 34, an RX_FIFO 36, a CRC detecting circuit 38, an address detecting circuit 40, a received results judging circuit 42, and an AND circuit 44.

The input end of the preamble detecting circuit 30 is connected to the output end of the demodulator 122. The output end of the preamble detecting circuit 30 is connected to the first input end of the SFD detecting circuit 32. The second input end of the SFD detecting circuit 32 is connected to the output end of the demodulator 122. The output end of the SFD detecting circuit 32 is connected to the first input end of the data length detecting circuit 34 and to the first input end of the interface circuit 126. The second input end of the data length detecting circuit 34 is connected to the output end of the demodulator 122. The output end of the data length detecting circuit 34 is connected to the first input end of the RX_FIFO 36, the first input end of the CRC detecting circuit 38, the first input end of the address detecting circuit 40, and the first input end of the received results judging circuit 42. The second input end of the RX_FIFO 36 is connected to the output end of the demodulator 122. The third input end of the RX_FIFO 36 is connected to the first output end of the interface circuit 126. The output end of the RX_FIFO 36 is connected to the second input end of the interface circuit 126. The second output end of the CRC detecting circuit 38 is connected to the output end of the demodulator 122. The second input end of the address detecting circuit 40 is connected to the output end of the demodulator 122. The output end of the address detecting circuit 40 is connected to the first input end of the AND circuit 44. The second input end of the received results judging circuit 42 is connected to the output end of the CRC detecting circuit 38. The first input end of the received results judging circuit 42 is connected to the third input end of the interface circuit 126. The second output end of the received results judging circuit 42 is connected to the second input end of the AND circuit 44. The output end of the AND circuit 44 is connected to the fourth input end of the interface circuit 126.

The preamble detecting circuit 30 detects the preamble that is included in the information to be processed that is inputted from the RF device 124 via the demodulator 122, and judges whether or not the RF device 124 and the demodulator 122 are operating normally, and outputs, to the SFD detecting circuit 32, a signal expressing the judgment results.

When it is judged by the preamble detecting circuit 30 that the RF device 124 and the demodulator 122 are operating normally, the SFD detecting circuit 32 starts detection of the SFD that is included in the information to be processed that is inputted from the RF device 124 via the demodulator 122. When the SFD detecting circuit 32 detects the SFD, the SFD detecting circuit 32 outputs, to the data length detecting circuit 34, an SFD detection notification signal expressing that the SFD has been detected, and outputs the signal to the control device 18A via the interface circuit 126.

In response to the SFD detection notification signal inputted from the SFD detecting circuit 32, the data length detecting circuit 34 starts detection of the data length included in the information to be processed that is inputted from the RF device 124 via the demodulator 122. When the data length detecting circuit 34 detects the data length, the data length detecting circuit 34 outputs an acquisition start instruction signal, that instructs starting of acquisition of the information to be processed, to the RX_FIFO 36, the CRC detecting circuit 38 and the address detecting circuit 40. When the data length detecting circuit 34 detects the data length, the data length detecting circuit 34 counts each time that one byte of the information to be processed is inputted from the RF device 124 via the demodulator 122. When information to be processed of an amount corresponding to the data length is acquired, the data length detecting circuit 34 outputs an acquisition stop instruction signal, that instructs stoppage of the acquisition of the information to be processed, to the RX_FIFO 36, the CRC detecting circuit 38 and the address detecting circuit 40, and outputs an acquisition completion notification signal, that gives notice of completion of acquisition of the information to be processed, to the received results judging circuit 42.

The RX_FIFO 36 starts acquiring the information to be processed from the RF device 124 via the demodulator 122 in accordance with the acquisition start instruction signal inputted from the data length detecting circuit 34, and stops acquiring the information to be processed in accordance with the acquisition stop instruction signal inputted from the data length detecting circuit 34. When a request signal that requests outputting of the information to be processed is outputted from the control device 18A via the interface circuit 126, the RX_FIFO 36 successively outputs the acquired information to be processed to the control device 18A via the interface circuit 126 in accordance with the request signal inputted from the control device 18A.

The CRC detecting circuit 38 starts acquiring the information to be processed from the RF device 124 via the demodulator 122 in accordance with the acquisition start instruction signal inputted from the data length detecting circuit 34, and stops acquiring the information to be processed in accordance with the acquisition stop instruction signal inputted from the data length detecting circuit 34. The CRC detecting circuit 38 detects the CRC included in the acquired information to be processed, and, by using the detected CRC, judges whether or not there are data errors in the information to be processed, and outputs, to the received results judging circuit 42, a CRC judgment results signal that expresses the judgment results.

The address detecting circuit 40 starts acquiring the information to be processed from the RF device 124 via the demodulator 122 in accordance with the acquisition start instruction signal inputted from the data length detecting circuit 34, and stops acquiring the information to be processed in accordance with the acquisition stop instruction signal inputted from the data length detecting circuit 34. At usual times, the address detecting circuit outputs a low level signal to the AND circuit 44, and detects the address included in the acquired information to be processed, and judges whether or not the detected address matches an address that is registered in advance, i.e., the MAC address assigned in advance to the illuminating device 12A. If it is judged that the addresses match, the address detecting circuit 40 switches the output to the AND circuit 44 from the low level signal to a high level signal.

When the acquisition completion notification signal is inputted from the data length detecting circuit 34, the received results judging circuit 42 outputs, to the control device 18A via the interface circuit 126, a receipt completion interruption signal that expresses that receipt by the communication device 16A of the information to be processed has been completed. At usual times, the received results judging circuit 42 outputs a low level signal to the AND circuit 44. When the acquisition completion notification signal is inputted from the data length detecting circuit 34, and the CRC judgment results signal expressing that there are no data errors in the information to be processed is inputted from the CRC detecting circuit 38, the received results judging circuit 42 switches the output to the AND circuit 44 from the low level signal to a high level signal for a predetermined time period (e.g., 0.01 seconds).

When the high level signal is inputted from the address detecting circuit 40 and the high level signal is inputted from the received results judging circuit 42, the AND circuit 44 outputs a receipt completion signal to the control device 18A via the interface circuit 126.

The transmitting system circuit 24B is a circuit that manipulates inputted data, and wirelessly transmits the manipulated data to the RF device 124. The transmitting system circuit 24B is structured to include a TX_FIFO 46, a CRC generating circuit 48, a transmission counter 50, and a selection circuit 52.

The first input end of the TX_FIFO 46 is connected to the second output end of the interface circuit 126. The second input end of the TX_FIFO 46 is connected to the third output end of the interface circuit 126. The third input end of the TX_FIFO 46 is connected to the first output end of the transmission counter 50. The output end of the TX_FIFO 46 is connected to the first input end of the selection circuit 52. The first input end of the CRC generating circuit 48 is connected to the second output end of the interface circuit 126. The second input end of the CRC generating circuit 48 is connected to the third output end of the interface circuit 126. The third input end of the CRC generating circuit 48 is connected to the second output end of the transmission counter 50. The output end of the CRC generating circuit 48 is connected to the second input end of the selection circuit 52. The first input end of the transmission counter 50 is connected to the second output end of the interface circuit 126. The second input end of the transmission counter 50 is connected to the third output end of the interface circuit 126. The third input end of the transmission counter 50 is connected to the fourth output end of the interface circuit 126. The third output end of the transmission counter 50 is connected to the third input terminal of the selection circuit 52. The output end of the selection circuit 52 is connected to the input end of the modulator 120.

The second output end of the interface circuit 126 is connected also to the third input end of the address detecting circuit 40. Further, the third output end of the interface circuit 126 is connected also to the fourth input end of the address detecting circuit 40.

The control circuit 18A outputs an acquisition preparation request signal, that requests preparations for acquiring data, to the address detecting circuit 40, the TX_FIFO 46, the CRC generating circuit 48 and the transmission counter 50, respectively. After outputting the acquisition preparation request signal, the control circuit 18A outputs data to the address detecting circuit 40, the TX_FIFO 46, the CRC generating circuit 48 and the transmission counter 50, respectively. The MAC address, that serves as identification information that identifies the illuminating device 12A, can be given as an example of the data that is outputted from the control device 18A to the address detecting circuit 40. Digital data in the information to be processed, other than the CRC, can be given as an example of the data that is outputted from the control device 18A to the TX_FIFO 46, the CRC generating circuit 48 and the transmission counter 50.

In accordance with the acquisition preparation request signal inputted from the control device 18A, the address detecting circuit 40 carries out preparations to acquire data. When the data acquisition preparations are completed, the address detecting circuit 40 acquires and registers the address inputted from the control device 18A via the interface circuit 126.

In accordance with the acquisition preparation request signal inputted from the control device 18A, the TX_FIFO 46 carries out preparations to acquire data. When the data acquisition preparations are completed, the TX_FIFO 46 acquires, in the order of the preamble, the SFD, the data length, the address and the illumination instruction information, the digital data other than the CRC among the information to be processed that has been inputted from the control device 18A via the interface circuit 126. The TX_FIFO 46 stores the digital data inputted from the control device 18A via the interface circuit 126, and outputs stored digital data to the selection circuit 52 in accordance with an instruction.

In accordance with the acquisition preparation request signal inputted from the control device 18A, the CRC generating circuit 48 carries out preparations to acquire data. When the data acquisition preparations are completed, the CRC generating circuit 48 acquires, in the order of the preamble, the SFD, the data length, the address and the illumination instruction information, the digital data other than the CRC among the information to be processed that has been inputted from the control device 18A via the interface circuit 126. The CRC generating circuit 48 stores the digital data inputted from the control device 18A via the interface circuit 126, and generates a CRC on the basis of the data length, the address and the illumination instruction information included in the stored digital data, and outputs the generated CRC to the selection circuit 52 in accordance with an instruction.

In accordance with the acquisition preparation request signal inputted from the control device 18A, the transmission counter 50 carries out preparations to acquire data. After the data acquisition preparations have been carried out at the transmission counter 50, the transmission counter 50 acquires, in accordance with an instruction and in the order of the preamble, the SFD, the data length, the address and the illumination instruction information, the digital data other than the CRC among the information to be processed that has been inputted from the control device 18A via the interface circuit 126. When a transmission request signal is inputted from the control device 18A via the interface circuit 126, the transmission counter 50 computes, on the basis of the data length, a preamble region, an SFD region, a data length region, an address region, and an illumination instruction information region, and, on the basis of the computed results, instructs the TX_FIFO 46 to output digital data to the selection circuit 52, and instructs the CRC generating circuit 48 to generate and output a CRC. The transmission counter 50 outputs, to the selection circuit 52, an instruction signal that instructs which of the digital data inputted to the selection circuit 52 from the TX_FIFO 46, or the digital data inputted to the selection circuit 52 from the CRC generating circuit 48, is to be outputted to the modulator 120.

In accordance with the instruction signal inputted from the transmission counter 50, the selection circuit 52 outputs, to the modulator 120, either the digital data inputted to the selection circuit 52 from the TX_FIFO 46 or the digital data inputted to the selection circuit 52 from the CRC generating circuit 48.

The transmission/receipt control circuit 24C is a circuit for controlling the RF device 124 in accordance with an instruction from the control device 110 via the interface circuit 126. The input end of the transmission/receipt control circuit is connected to the fifth output end of the interface circuit 126, and the output end is connected to the input end of the RF device 124. Accordingly, when an RF control request signal that expresses a control request with respect to the RF device 124 is inputted to the transmission/receipt control circuit 23C from the control device 110 via the interface circuit 126, the transmission/receipt control circuit 24C controls the RF device 124 in accordance with the control request expressed by the RF control request signal. Note that examples of the "control request" are requests to output a start-up command, a transmit command, a receive command, a stop command, and a channel switch command with respect to the RF device 124.

Operation of the illuminating system 10A relating to the first exemplary embodiment is described next with reference to FIG. 5. Note that FIG. 5 is a state transition diagram showing the flow of processing at the illuminating system 10A.

Figure 5:
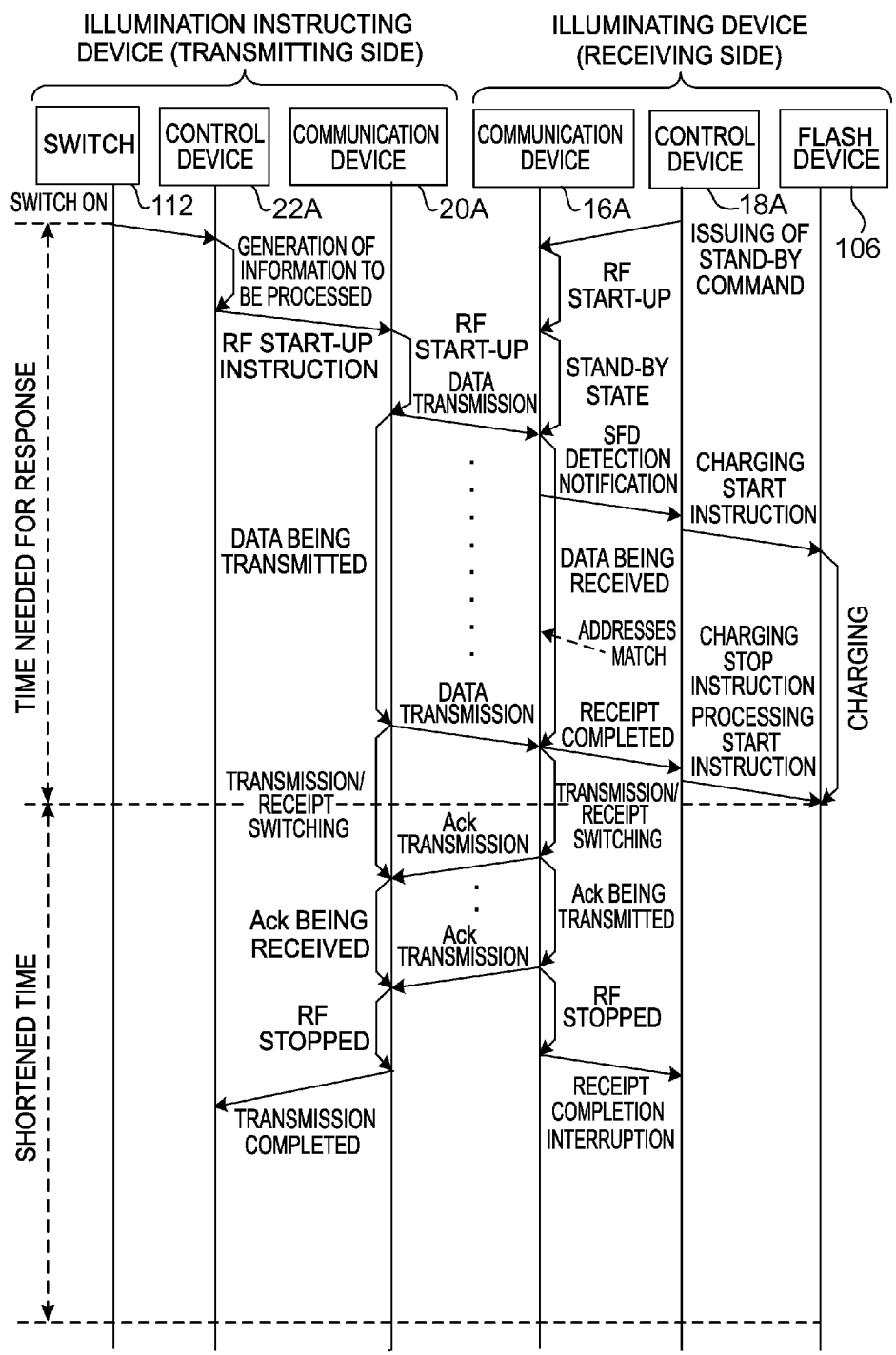
FIG. 5 is a state transition diagram in a case in which predetermined conditions are satisfied, and is an example of the transition of states in the illuminating system relating to the first exemplary embodiment.

As shown in FIG. 5, at the illumination instructing device 14A, when the switch 112 is operated on (switch on), the control device 22A generates information to be processed except for the CRC, and outputs, to the communication device 20A, the generated information to be processed and an RF control request signal that serves as an RF start-up instruction signal that instructs start-up of the RF device 124, that is in a stopped state, of the communication device 20A. In response to the RF control request signal inputted from the control device 22A, the communication device 20A starts-up the RF device 124 and sets the RF device 124 in the transmittable state. Thereafter, the communication device 20A adds a CRC to the information to be processed that has been inputted from the control device 22A, and wirelessly transmits the information to be processed to the illuminating device 12A (data transmission). Then, when the wireless transmission of the information to be processed is completed, the communication device 20A shifts the RF device 124 from the transmittable state to the receivable state.

At the illuminating device 12A, when the power source (not shown) is turned on, a standby command is issued from the control device 18A to the communication device 16A, and a predetermined address (the MAC address of the illuminating device 12A) is issued to the address detecting circuit 40. In accordance with a standby command inputted from the control device 18A, the communication device 16A starts-up the RF device 124 and sets the RF device 124 in the receivable state. Thereafter, the communication device 16A awaits receipt of the information to be processed that is to be transmitted from the illumination instructing device 14A. When transmission of the information to be processed from the illumination instructing device 14A is started, the communication device 16A receives the transmitted information to be processed, and stores the received information to be processed in the RX_FIFO 36, and transfers the information to be processed to the control device 18A in accordance with a request from the control device 18A. Then, when the communication device 16A detects the SFD from the information to be processed that has already been received, the communication device 16A outputs an SFD detection notification signal to the control device 18A. In accordance with the SFD detection notification signal inputted from the communication device 16A, the control device 18A instructs the flash device 106 to start charging. The flash device 106 receives the instruction from the control device 18A, and starts charging.

The communication device 16A detects the address and the CRC that are included in the received information to be processed. If the communication device 16A judges that the detected address matches the address registered in advance, and judges, from the detected CRC, that there are no data errors, the communication device 16A outputs, to the control device 18A, a receipt completion signal at the point in time when receipt of the information to be processed is completed. In accordance with the receipt completion signal inputted from the communication device 16A, the control device 18A instructs the flash device 106 to stop charging, and instructs the flash device 106 to illuminate supplementary light. In accordance therewith, the flash device 106 stops charging and illuminates supplementary light.

When receipt of the information to be processed is completed, the communication device 16A shifts the RF device 124 from the receivable state to the transmittable state, and starts wireless transmission, to the illumination instructing device 14A, of an Ack response packet expressing that the receipt of data has been completed normally. When the wireless transmission of the Ack response packet is completed, the communication device 16A shifts the RF device 124 from the transmittable state to the stopped state, and thereafter, outputs a receipt completion interruption signal to the control device 18A.

When transmission of the Ack response packet from the communication device 16A of the illuminating device 12 is started, the communication device 20A of the illumination instructing device 14A continues to receive the Ack response packet until transmission of the Ack response packet is completed. Then, when receipt of the Ack response packet is completed, the communication device 20A shifts the RF device 124 from the receivable state to the stopped state, and thereafter, outputs, to the control device 22A, a transmission completion notification signal that gives notice that transmission of the information to be processed to the illuminating device 12A has been completed. The control device 22A receives the transmission completion notification signal inputted from the communication device 20A.

Figure 6:
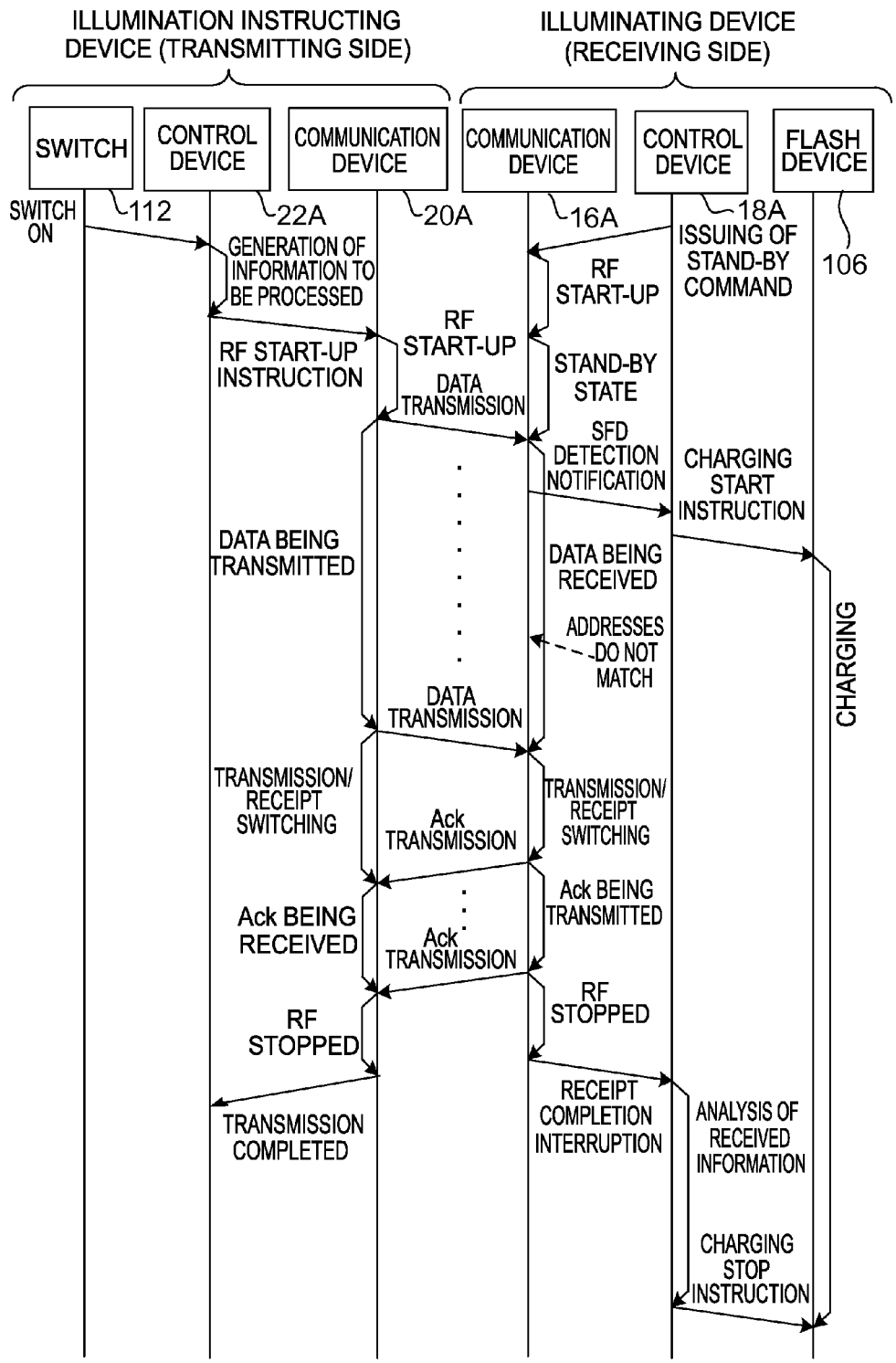
FIG. 6 is a state transition diagram in a case in which predetermined conditions are not satisfied, and is an example of the transition of states in the illuminating system relating to the first exemplary embodiment.

Next, operation of the illuminating system 10A when the address included in the information to be processed received by the communication device 16A, and the pre-registered address, do not match, is described with reference to FIG. 6. Note that FIG. 6 is a state transition diagram showing the flow of processing at the illuminating system 10A. In FIG. 6, the transitions of the states of the illumination instructing device 14A, and the transitions of the states that are shown in FIG. 5 from the switch 112 being turned on until the start of charging by the flash device 106, are the same. Therefore, transitions of the states of the illuminating device 12A from after charging is started by the flash device 106 are described hereinafter.

As shown in FIG. 6, at the communication device 16A, in a case in which the address included in the information to be processed that has been transmitted from the illumination instructing device 14A does not match the address that is registered in advance, when receipt of the information to be processed is completed, the communication device 16A shifts the RF device 124 from the receivable state to the transmittable state, and starts wireless transmission, to the illumination instructing device 14A, of an Ack response packet expressing that receipt of the data has been completed normally. When wireless transmission of the Ack response packet is completed, the communication device 16A shifts the RF device 124 from the transmittable state to the stopped state, and thereafter, outputs a receipt completion interruption signal to the control device 18A. When the receipt completion interruption signal is inputted to the control device 18A without a receipt completion signal having been inputted from the communication device 16A, the control device 18A analyzes the information to be processed that has been inputted from the communication device 16, and thereafter, instructs the flash device 106 to stop charging. The flash device 106 receives the instruction to stop charging from the control device 18A, and stops charging.

Figure 10:
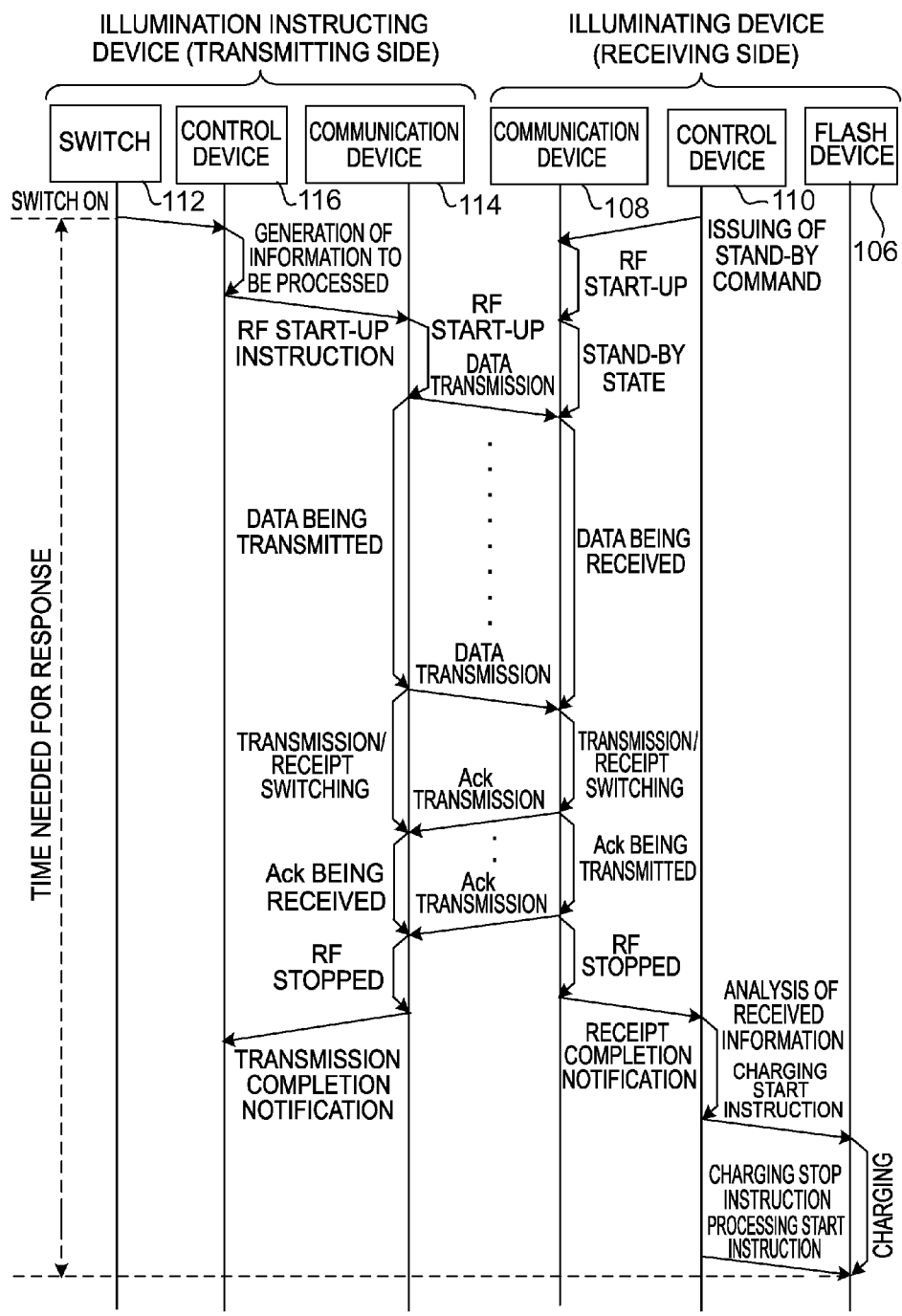
FIG. 10 is a state transition drawing showing an example of the transition of states in the conventional illuminating system.

In this way, at the illuminating system 10A relating to the present first exemplary embodiment, the time required from the switch 112 of the illumination instructing device 14A being turned on until illumination of supplementary light by the flash device 106 is started (the time needed for response) can be greatly shortened (the throughput can be improved) as compared with the case shown in FIG. 10. Therefore, the occurrence of situations in which processing executed by the control device 18A is delayed can be suppressed.

As described above, the illuminating system 10A relating to the present first exemplary embodiment has: the RF device 124 that serves as a receiving unit that receives information to be processed including valid data that has illumination instruction information serving as processing contents information and an address serving as identification information, an SFD that is disposed in front of the valid data and that serves as start information that expresses the start of the valid data, and a CRC for detecting errors in the valid data; and a control circuit 24 that, when the SFD is received during receipt of the information to be processed by the RF device 124, controls the flash device 106 that serves as an apparatus such that starting of charging is executed, on the basis of the illumination instruction information, as an initial processing of the time of executing processing, and, in a case in which an address is included in the information to be processed that is received by the RF device 124, controls the flash device 106 such that stopping of charging and illuminating of supplementary light are executed, on the basis of the illumination instruction information, as processing that follow the initial processing of the time of executing processing, and, in a case in which an address is not included in the information to be processed that is received by the RF device 124, controls the flash device 106 such that stopping of charging and illuminating of supplementary light are not executed. Due thereto, the occurrence of a situation in which processing is delayed at the illuminating system 10A can be suppressed.

In accordance with the illuminating system 10A relating to the present first exemplary embodiment, when an SFD is received during receipt of the information to be processed by the RF device 124, the flash device 106 is controlled such that starting of charging is executed, on the basis of the illumination instruction information, as an initial processing of the time of executing processing. When both of an identification condition, that is that an address is included in the information to be processed that is received by the RF device 124, and an error condition, that is that no error has been detected from the CRC, are satisfied, the flash device 106 is controlled such that stopping of charging and illuminating of supplementary light are executed. If at least one of the identification condition and the error condition is not satisfied, the flash device 106 is controlled such that stopping of charging and illuminating of supplementary light are not executed. Due thereto, the occurrence of a situation in which processing is delayed at the illuminating system 10A can be suppressed.

Second Exemplary Embodiment

The above first exemplary embodiment describes an example in accordance with a hardware structure that applies the control circuit 24 to the communication device 16A. However, in the present second exemplary embodiment, there is described an example of a case in which some of the processings by the communication device 16A are realized by a software structure. Note that, in the present second exemplary embodiment, portions that are the same as in the first exemplary embodiment are denoted by the same reference numerals, and description thereof is omitted. Points in the present second exemplary embodiment that differ from the first exemplary embodiment are described.

FIG. 1 is a schematic drawing showing an example of the structure of an illuminating system 10B relating to the present second exemplary embodiment. As shown in FIG. 1, the illuminating system 10B has an illuminating device 12B and an illumination instructing device 14B.

The illuminating device 12B differs from the illuminating device 12A described in the first exemplary embodiment only with regard to the points that the illuminating device 12B has a communication device 16B instead of the communication device 16A, and has, instead of the control device 18A, a control device 18B that controls the illuminating device 12B overall.

The illumination instructing device 14B differs from the illumination instructing device 14A described in the first exemplary embodiment only with regard to the points that the illumination instructing device 14B has a communication device 20B instead of the communication device 20A, and has, instead of the control device 22A, a control device 22B that controls the illumination instructing device 14B overall.

Figure 7:
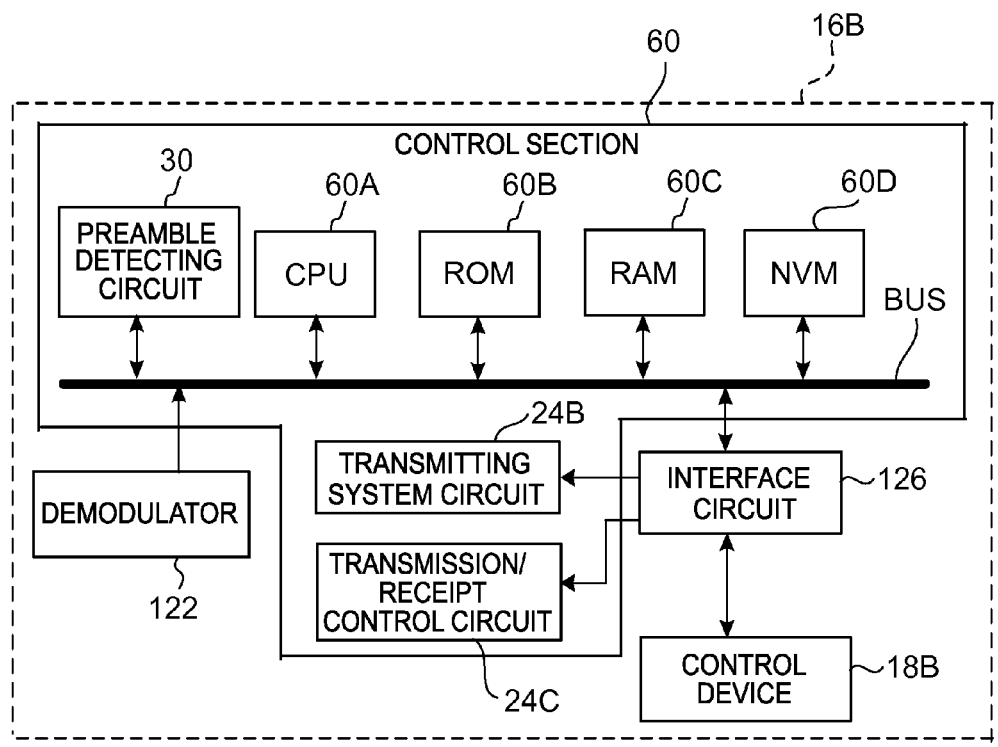
FIG. 7 is a block diagram showing main structures of a communication device of an illuminating system relating to a second exemplary embodiment.

A structural example of the communication device 16B is shown in FIG. 7. Note that, although the communication device 20B of the illumination instructing device 14B is also structured similarly, here, the communication device 16B is described as an example. As shown in FIG. 7, the communication device 16B differs from the communication device 16A described in the first exemplary embodiment only with regard to the point that a control section 60 is applied instead of the control circuit 24.

The control section 60 is structured to include a CPU (Central Processing Unit) 60A, a ROM (Read Only Memory) 60B, a RAM (Random Access Memory) 60C, an NVM (Non Volatile Memory) 60D, the transmitting system circuit 24B, and the transmission/receipt control circuit 24C.

The CPU 60A governs the operations of the control section 60 overall. The ROM 60B is a storage medium in which a control program that controls operations of the communication device 16B, an information processing program that is described later, various types of parameters, and the like are stored in advance. The RAM 60C is a storage medium that is used as a work area or the like when various programs are executed. The NVM 60D is a non-volatile storage medium that stores various types of information that must be kept even if the power switch of the device is turned off.

The CPU 60A, the ROM 60B, the RAM 60C, the NVM 60D, the interface circuit 126 and the demodulator 122 are connected to one another via a bus BUS such as a system bus or the like. Accordingly, the CPU 60A can respectively carry out access to the ROM 60B, the RAM 60C and the NVM 60D, receipt of various types of information from the control device 18B via the interface circuit 126, transmission of various types of information to the control device 18B via the interface circuit 126, and receipt of data from the RF device 124 via the demodulator 122.

Operation of the illuminating system 10B relating to the present second exemplary embodiment is described next with reference to FIG. 8. Note that, at the illuminating system 10B relating to the present second exemplary embodiment, only the operation of the illuminating device 12B, that is applied instead of the illuminating device 12A, differs as compared with the illuminating system 10A described in the first exemplary embodiment. Therefore, only operation of the illuminating device 12B is described hereinafter.

Figure 8:
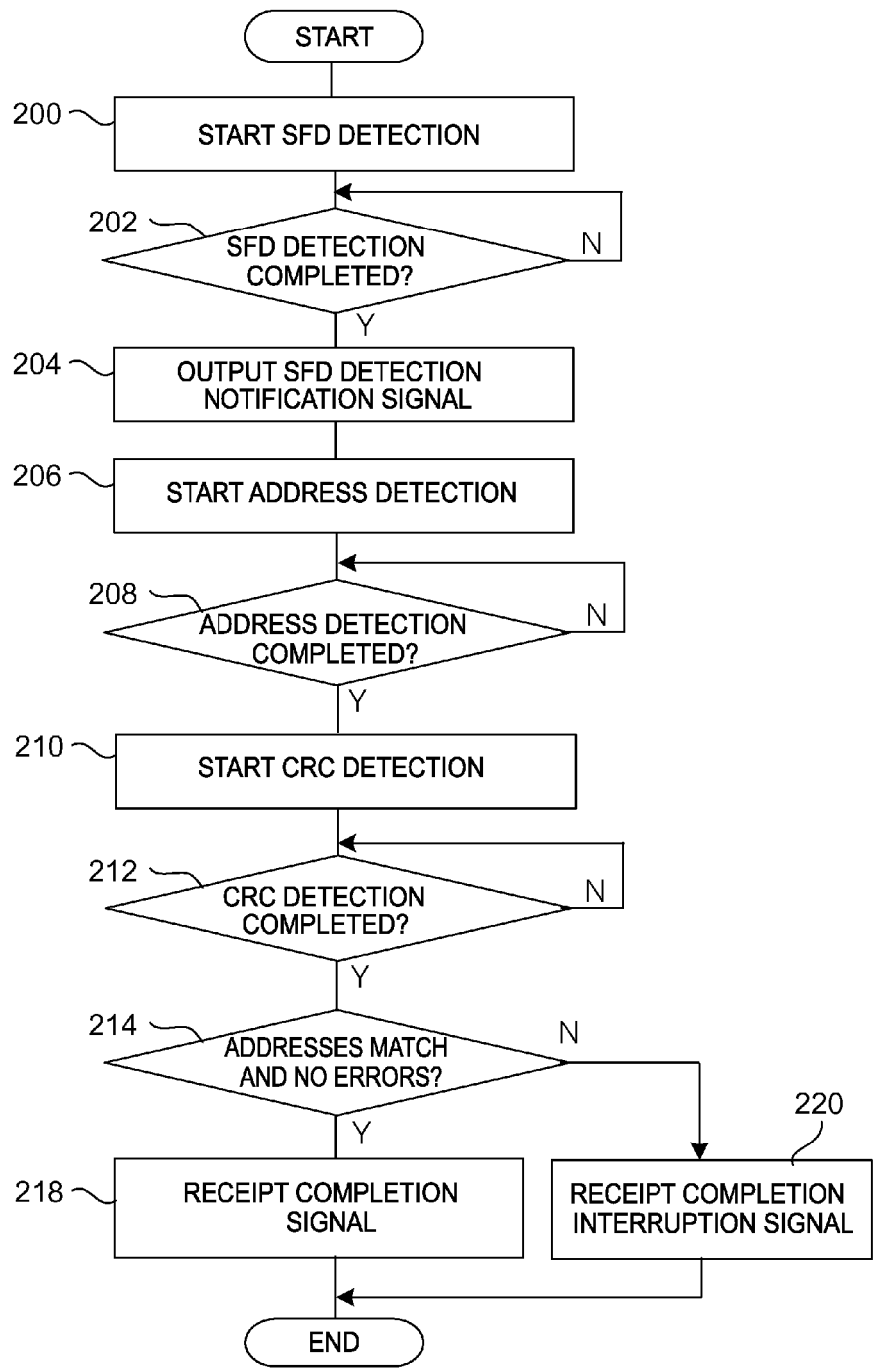
FIG. 8 is a flowchart showing the flow of processing of an information processing program relating to the second exemplary embodiment.
Figure 9:
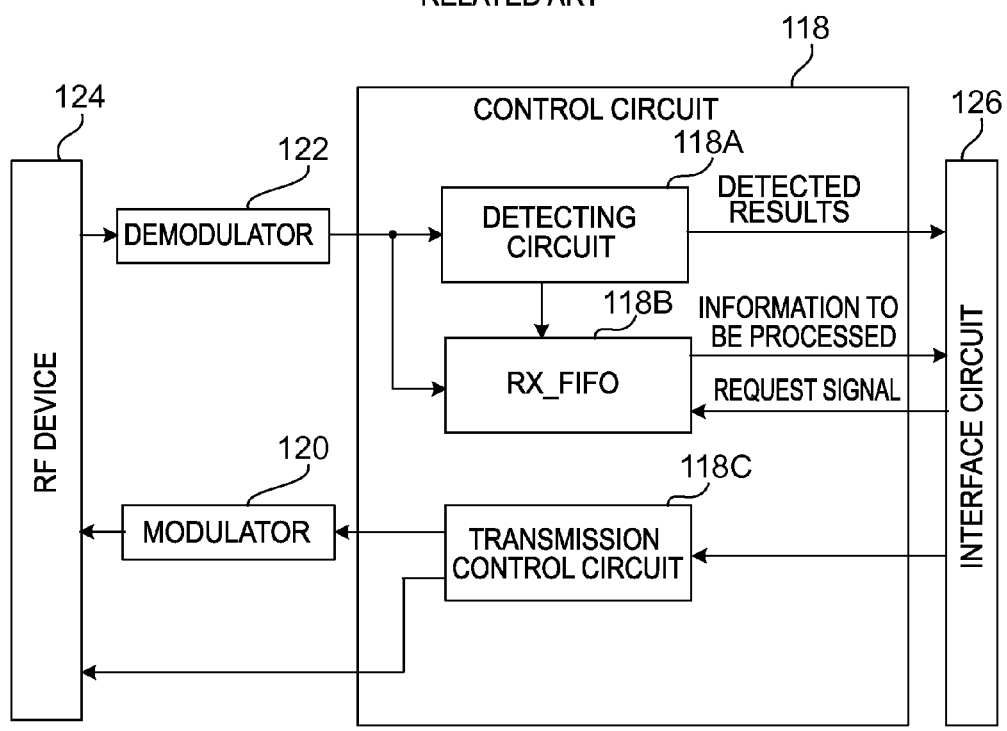
FIG. 9 is a block diagram showing main structures of a control circuit of the communication device at the conventional illuminating system.

FIG. 8 is a flowchart showing the flow of processings of an information processing program that is executed by the CPU 60A when the illuminating device 12B starts receipt of the information to be processed that is transmitted from the illumination instructing device 14B. In step 200 of FIG. 8, detection of the SFD is started with respect to the information to be processed that has already been received, and in next step 202, the routine awaits detection of the SFD. When the SFD is detected, the judgment in step 202 becomes affirmative, and the routine moves on to step 204. In step 204, the SFD detection notification signal is outputted to the control device 18B. Thereafter, the routine moves on to step 206 where detection of the address is started with respect to the information to be processed that has already been received. In next step 208, the routine awaits detection of the address. When the address is detected, the judgment in step 208 becomes affirmative, and the routine moves on to step 210.

In step 210, detection of the CRC is started with respect to the information to be processed that has already been received. In next step 212, the routine awaits detection of the CRC. When the CRC is detected, the judgment in step 212 becomes affirmative, and the routine moves on to step 214.

In step 214, it is judged whether or not a condition, that is that the address detected in the processing of above step 208 is the address that has been registered in advance, and a condition, that is that, from the CRC detected in the processing of above step 212, there are no errors in the information to be processed, are satisfied. If the judgment is affirmative, the routine moves on to step 218 where a receipt completion signal is outputted to the control device 18B, and thereafter, the present information processing program ends.

If the judgment in step 214 is negative, the routine moves on to step 220 where a receipt completion interruption signal is outputted without the receipt completion signal being outputted to the control device 18B. Thereafter, the present information processing program ends.

In this way, in the illuminating device 12B of the illuminating system 10B relating to the second exemplary embodiment, steps 200 through 204 of the flowchart shown in FIG. 8 function as the SFD detecting circuit 32 shown in FIG. 4, steps 206, 208 and 214 of the flowchart shown in FIG. 8 function as the address detecting circuit 40 shown in FIG. 4, steps 210, 212 and 214 of the flowchart shown in FIG. 8 function as the CRC detecting circuit 38 shown in FIG. 4, step 218 of the flowchart showing in FIG. 8 functions as the AND circuit 44 shown in FIG. 4, and step 220 of the flowchart shown in FIG. 8 functions as the received results judging circuit 42 shown in FIG. 4.

Note that the above exemplary embodiments describe examples of cases in which the receipt completion signal is outputted only when the condition (identification condition) that the address included in the information to be processed is the pre-registered address, and the condition (error condition) that there are no data errors in the information to be processed, are both satisfied. However, the present invention is not limited to the same. The receipt completion signal may be outputted if the identification condition is satisfied, even if the error condition is not satisfied. In this case, there is no need to generate the CRC, and therefore, even more rapid execution of processing can be realized.

The above exemplary embodiments describe examples of cases in which the information to be processed is transmitted and received by wireless communication being carried out between the illuminating device 102 and the illumination instructing device 104. However, the present invention is not limited to the same, and the information to be processed may be transmitted and received by wired communication.

Although errors in the data are detected by the CRC in the above exemplary embodiments, the present invention is not limited to the same. Errors in the data may be detected by using an error detection method such as, for example, parity checksum, constant ratio codes, mirroring, or the like. Any method may be used provided that it can be used for detecting errors in data.

Because the above exemplary embodiments describe examples of cases using an IEEE 802.3 frame, SFD is described as an example. However, the present invention is not limited to the same, and a unique word corresponding to the type of the frame or the communication standard may be used. Note that, in front of the valid data, a preamble and a unique word (SFD) are arrayed in that order from the head, and a preamble that is disposed in front of the unique word more easily gives rise to errors than the unique word. Accordingly, it is preferable that the instruction to start charging be given when the unique word is detected, and not when the preamble is detected.

Although the MAC address is used as the address included in the information to be processed in the above-described exemplary embodiments, the present invention is not limited to the same, and information that is assigned uniquely to the apparatus, such as the IP address or the like, may be used.

The second exemplary embodiment describes an example of a case in which the SFD detecting circuit 32, the data length detecting circuit 34, the RX_FIFO 36, the CRC detecting circuit 38, the address detecting circuit 40, the received results judging circuit 42 and the AND circuit 44 that are shown in FIG. 4 are realized by a software structure. However, some of these may be made into a software structure, and the remainder may be made into hardware structures such as an ASIC (Application Specific Integrated Circuit) or a programmable logic device or the like. Due thereto, processing that is higher speed than in the structure of the illuminating system 10B relating to the above-described second exemplary embodiment can be realized.

Although the above exemplary embodiments describe examples of cases in which the present invention is applied to an illuminating system, the present invention is not limited to the same. The present invention can be applied to any type of system provided that it is a system having an apparatus needing an improvement in throughput and is a system in which the transmission and receipt between a transmitting-side apparatus and a receiving-side apparatus are synchronized, such as a system for controlling liquid crystal shutter glasses for viewing stereoscopic video (in this case, the information processing device of the present invention is applied to the liquid crystal shutter glasses), or an audio system having an audio apparatus that is operated by remote operation by a remote controller (in this case, the information processing device of the present invention is applied to the audio apparatus), or the like. Note that, when the present invention is applied to a system other than an illuminating system, it suffices to use information, that expresses the contents of the processing that is to be executed by the apparatus that the information processing device of the present invention is applied to, instead of the "illumination instruction information" that is included in the information to be processed shown in FIG. 2.

Embodiments of the present invention are described above, but the present invention is not limited to the embodiments as will be clear to those skilled in the art.

The present invention provides an information processing device, a communication system, an information processing method, and a non-transitory computer readable medium storing a program by which the occurrence of a situation in which processing is delayed can be suppressed.

In accordance with a first aspect of the present invention, there is provided an information processing device which includes: a receiving unit that receives information to be processed that includes valid data, the valid data having processing content information expressing contents of processing to be executed by an apparatus and identification information identifying the apparatus, and that includes start information that is disposed in front of the valid data and indicates a start of the valid data; and a control unit that, when the start information is received during receipt of the information to be processed by the receiving unit, controls the apparatus such that an initial processing of a time of executing the processing is executed on the basis of the processing content information, and, if the identification information is included in the information to be processed that is received by the receiving unit, controls the apparatus such that processing that follows the initial processing of the time of executing the processing is executed, and, if the identification information is not included in the information to be processed that is received by the receiving unit, controls the apparatus such that the processing that follows the initial processing is not executed.

In the information processing device of the first aspect, the information to be processed that includes valid data, that has processing content information expressing contents of processing to be executed by an apparatus and identification information identifying the apparatus, and start information that is disposed in front of the valid data and indicates a start of the valid data, is received by the receiving unit.

When the start information is received during receipt of the information to be processed by the receiving unit, the apparatus is controlled by the control unit such that an initial processing of a time of executing the processing is executed on the basis of the processing content information. If the identification information is included in the information to be processed that is received by the receiving unit, the apparatus is controlled by the control unit such that processing that follows the initial processing of the time of executing the processing is executed. If the identification information is not included in the information to be processed that is received by the receiving unit, the apparatus is controlled by the control unit such that the processing that follows the initial processing is not executed.

In this way, in the information processing device in accordance with the first aspect, when the start information is received during receipt of the information to be processed by the receiving unit, the apparatus is controlled such that an initial processing of a time of executing the processing is executed on the basis of the processing content information, and, if the identification information is included in the information to be processed that is received by the receiving unit, the apparatus is controlled such that processing that follows the initial processing of the time of executing the processing is executed, and, if the identification information is not included in the information to be processed that is received by the receiving unit, the apparatus is controlled such that the processing that follows the initial processing is not executed. Due thereto, the occurrence of a situation in which processing is delayed can be suppressed.

In accordance with an information processing device of a second aspect, in the first aspect, if the identification information is included in the information to be processed that is received by the receiving unit, the control unit may control the apparatus such that the processing that follows the initial processing is executed when receipt of the valid data by the receiving unit ends. Due thereto, more rapid execution of processing can be realized.

In accordance with a third aspect of the present invention, there is provided an information processing device which includes: a receiving unit that receives information to be processed that includes valid data, the valid data having processing content information expressing contents of processing to be executed by an apparatus and identification information identifying the apparatus, and that includes start information that is disposed in front of the valid data and indicates a start of the valid data, and that includes error detection information that is for detecting errors of the valid data; and a control unit that, when the start information is received during receipt of the information to be processed by the receiving unit, controls the apparatus such that an initial processing of a time of executing the processing is executed on the basis of the processing content information, and, if both an identification condition, which is that the identification information is included in the information to be processed that is received by the receiving unit, and an error condition, which is that errors are not detected from the error detection information, are satisfied, controls the apparatus such that processing that follows the initial processing of the time of executing the processing is executed, and, if at least one of the identification condition and the error condition is not satisfied, controls the apparatus such that the processing that follows the initial processing is not executed.

In the information processing device of the third aspect, information to be processed that includes valid data, that has processing content information expressing contents of processing to be executed by an apparatus and identification information identifying the apparatus, and start information that is disposed in front of the valid data and indicates a start of the valid data, and error detection information that is for detecting errors of the valid data, is received by the receiving unit.

When the start information is received during receipt of the information to be processed by the receiving unit, the apparatus is controlled by the control unit such that an initial processing of a time of executing the processing is executed on the basis of the processing content information. If both an identification condition, that is that the identification information is included in the information to be processed that is received by the receiving unit, and an error condition, that is that errors are not detected from the error detection information, are satisfied, the apparatus is controlled by the control unit such that processing that follows the initial processing of the time of executing the processing is executed. If at least one of the identification condition and the error condition is not satisfied, the apparatus is controlled by the control unit such that the processing that follows the initial processing is not executed.

In this way, in the information processing device of the third aspect, when the start information is received during receipt of the information to be processed by the receiving unit, the apparatus is controlled such that an initial processing of a time of executing the processing is executed on the basis of the processing content information, and, if both an identification condition, that is that the identification information is included in the information to be processed that is received by the receiving unit, and an error condition, that is that errors are not detected from the error detection information, are satisfied, the apparatus is controlled such that processing that follows the initial processing of the time of executing the processing is executed, and, if at least one of the identification condition and the error condition is not satisfied, the apparatus is controlled such that the processing that follows the initial processing is not executed. Due thereto, the occurrence of a situation in which processing is delayed can be suppressed.

In accordance with an information processing device of a fourth aspect, in the third aspect, if both the identification condition and the error condition are satisfied, the control unit may control the apparatus such that the processing that follows the initial processing is executed when receipt of the valid data by the receiving unit ends. Due thereto, more rapid execution of processing can be realized.

In accordance with an information processing device of a fifth aspect, in the third or fourth aspect, the information to be processed may be structured such that the start information, the identification information, the processing content information and the error detection information are received in that order by the receiving unit. Due thereto, errors of the valid data can be detected with even higher accuracy.

In accordance with an information processing device of a sixth aspect, in the first through the fifth aspects, the identification information may be a MAC address or an IP address. Due thereto, the identification information can be obtained easily.

In accordance with an information processing device of a seventh aspect, in the first through the sixth aspects, the receiving unit may receive, by wireless communication, the information to be processed. Due thereto, the occurrence of a situation in which processing is delayed can be suppressed, even if the information to be processed is acquired by wireless communication.

A communication system of an eighth aspect of the present invention is structured to include: the information processing device of any of the first through seventh aspects; and a transmitting device that includes a generating unit that generates the information to be processed, and a transmitting unit that transmits, to the information processing device, the information to be processed that is generated by the generating unit.

Accordingly, the communication system of the eighth aspect operates similarly to the information processing device of any of the first through seventh aspects. Therefore, effects that are similar to those of the information processing device of any of the first through seventh aspects can be obtained.

In accordance with a ninth aspect of the present invention, there is provided an information processing method which includes: receiving, by a receiving unit, information to be processed that includes valid data, the valid data having processing content information expressing contents of processing to be executed by an apparatus and identification information identifying the apparatus, and that includes start information that is disposed in front of the valid data and indicates a start of the valid data; when the start information is received during receipt of the information to be processed, controlling the apparatus such that an initial processing of a time of executing the processing is executed on the basis of the processing content information; if the identification information is included in the received information to be processed, controlling the apparatus such that processing that follows the initial processing of the time of executing the processing is executed; and if the identification information is not included in the received information to be processed, controlling the apparatus such that the processing that follows the initial processing is not executed.

Accordingly, the information processing method of the ninth aspect operates similarly to the information processing device of the first aspect. Therefore, effects that are similar to those of the information processing device of the first aspect can be obtained.

In accordance with a tenth aspect of the present invention, there is provided an information processing method which includes: receiving, by a receiving unit, information to be processed that includes valid data, the valid data having processing content information expressing contents of processing to be executed by an apparatus and identification information identifying the apparatus, and that includes start information that is disposed in front of the valid data and indicates a start of the valid data, and that includes error detection information that is for detecting errors of the valid data; when the start information is received during receipt of the information to be processed, controlling the apparatus such that an initial processing of a time of executing the processing is executed on the basis of the processing content information; if both an identification condition, which is that the identification information is included in the received information to be processed, and an error condition, which is that errors are not detected from the error detection information, are satisfied, controlling the apparatus such that processing that follows the initial processing of the time of executing the processing is executed; and if at least one of the identification condition and the error condition is not satisfied, controlling the apparatus such that the processing that follows the initial processing is not executed.

Accordingly, the information processing method of the tenth aspect operates similarly to the information processing device of the third aspect. Therefore, effects that are similar to those of the information processing device of the third aspect can be obtained.

In accordance with an eleventh aspect of the present invention, there is provided a non-transitory computer readable medium storing a program causing a computer to execute information processing, the information processing which includes: receiving information to be processed that includes valid data, the valid data having processing content information expressing contents of processing to be executed by an apparatus and identification information identifying the apparatus, and that includes start information that is disposed in front of the valid data and indicates a start of the valid data; and when the start information is received during receipt of the information to be processed, controlling the apparatus such that an initial processing of a time of executing the processing is executed on the basis of the processing content information, and, if the identification information is included in the received information to be processed, controlling the apparatus such that processing that follows the initial processing of the time of executing the processing is executed, and, if the identification information is not included in the received information to be processed, controlling the apparatus such that the processing that follows the initial processing is not executed.

Accordingly, the program that is stored on the computer readable medium of the eleventh aspect causes a computer to function similarly to the information processing device of the first aspect. Therefore, effects that are similar to those of the information processing device of the first aspect can be obtained.

In accordance with a twelfth aspect of the present invention, there is provided a non-transitory computer readable medium storing a program causing a computer to execute information processing, the information processing which includes: receiving information to be processed that includes valid data, the valid data having processing content information expressing contents of processing to be executed by an apparatus and identification information identifying the apparatus, and that includes start information that is disposed in front of the valid data and indicates a start of the valid data, and that includes error detection information that is for detecting errors of the valid data; and when the start information is received during receipt of the information to be processed, controlling the apparatus such that an initial processing of a time of executing the processing is executed on the basis of the processing content information, and, if both an identification condition, which is that the identification information is included in the received information to be processed, and an error condition, which is that errors are not detected from the error detection information, are satisfied, controlling the apparatus such that processing that follows the initial processing of the time of executing the processing is executed, and, if at least one of the identification condition and the error condition is not satisfied, controlling the apparatus such that the processing that follows the initial processing is not executed.

Accordingly, the program that is stored on the computer readable medium of the twelfth aspect causes a computer to function similarly to the information processing device of the third aspect. Therefore, effects that are similar to those of the information processing device of the third aspect can be obtained.

In accordance with the present invention, the occurrence of a situation in which processing is delayed can be suppressed.

Embodiments of the present invention are described above, but the present invention is not limited to the embodiments as will be clear to those skilled in the art.

What is claimed is:
1. An information processing device comprising:
a receiving unit that receives information to be processed that includes valid data, the valid data having processing content information expressing contents of processing to be executed by an apparatus and identification information identifying the apparatus, and that includes start information that is disposed in front of the valid data and indicates a start of the valid data, the apparatus comprising a charge and discharge unit; and a control unit that detects the processing content information received by the receiving unit and controls the apparatus, wherein, after the control unit has detected the start information, the control unit outputs a signal to start charging to the apparatus, and after the control unit has detected the valid data, if the identification information matches a predetermined signal, the control unit outputs a signal to stop charging and a signal to start discharging to the apparatus, and if the identification information does not match the predetermined signal, the control unit outputs the signal to stop charging to the apparatus.

2. The information processing device of claim 1, wherein the identification information is a MAC address or an IP address.

3. The information processing device of claim 1, wherein the receiving unit receives, by wireless communication, the information to be processed.

4. A communication system comprising:
the information processing device of claim 1; and
a transmitting device that includes a generating unit that generates the information to be processed, and a transmitting unit that transmits, to the information processing device, the information to be processed that is generated by the generating unit.

5. The communication system of claim 4, wherein the identification information is a MAC address or an IP address.

6. The communication system of claim 4, wherein the receiving unit receives, by wireless communication, the information to be processed.

7. An information processing device comprising:
a receiving unit that receives information to be processed that includes valid data, the valid data having processing content information expressing contents of processing to be executed by an apparatus and identification information identifying the apparatus, and that includes start information that is disposed in front of the valid data and indicates a start of the valid data, and that includes error detection information that is for detecting errors of the valid data, the apparatus comprising a charge and discharge unit; and
a control unit that detects the processing content information received by the receiving unit and controls the apparatus, wherein, after the control unit has detected the start information, the control unit outputs a signal to start charging to the apparatus, and after the control unit has detected the valid data, if both an identification condition, which is that the identification information is included in the information to be processed that is received by the receiving unit, and an error condition, which is that errors are not detected from the error detection information, are satisfied, the control unit outputs a signal to stop charging and a signal to start discharging to the apparatus, and, if at least one of the identification condition and the error condition is not satisfied, the control unit outputs the signal to stop charging to the apparatus.

8. The information processing device of claim 7, wherein the information to be processed is structured such that the start information, the identification information, the processing content information and the error detection information are received in that order by the receiving unit.

9. The information processing device of claim 7, wherein the identification information is a MAC address or an IP address.

10. The information processing device of claim 7, wherein the receiving unit receives, by wireless communication, the information to be processed.

11. A communication system comprising:
the information processing device of claim 7; and
a transmitting device that includes a generating unit that generates the information to be processed, and a transmitting unit that transmits, to the information processing device, the information to be processed that is generated by the generating unit.

12. The communication system of claim 11, wherein the information to be processed is structured such that the start information, the identification information, the processing content information and the error detection information are received in that order by the receiving unit.

13. The communication system of claim 11, wherein the identification information is a MAC address or an IP address.

14. The communication system of claim 11, wherein the receiving unit receives, by wireless communication, the information to be processed.

15. An information processing method comprising:
receiving, by a receiving unit, information to be processed that includes valid data, the valid data having processing content information expressing contents of processing to be executed by an apparatus and identification information identifying the apparatus, and that includes start information that is disposed in front of the valid data and indicates a start of the valid data, the apparatus comprising a charge and discharge unit;
after detecting the start information, outputting a signal to start charging to the apparatus;
after detecting the valid data, if the identification information matches a predetermined signal, outputting a signal to stop charging and a signal start discharging to the apparatus, and if the identification information does not match the predetermined signal, outputting the signal to stop charging to the apparatus.

16. An illuminating device comprising:
a communication device that receives information to be processed that includes valid data, the valid data having processing content information expressing contents of processing to be executed by a flash device and identification information identifying the flash device, and that includes start information that is disposed in front of the valid data and indicates a start of the valid data, the flash device comprising a charge and discharge unit;
a control device that detects the processing content information received by the communication device and controls the flash device, wherein, after the control device has detected the start information, the control device outputs a signal to start charging to the flash device, and after the control device has detected the valid data, if the identification information matches a predetermined signal, the control device outputs a signal to stop charging and a signal to start discharging to the flash device, and if the identification information does not match the predetermined signal, the control device outputs the signal to stop charging to the flash device; and
the flash device that performs charging and discharging in accordance with a signal output from the control device.

17. An illuminating device comprising:
a communication device that receives information to be processed that includes valid data, the valid data having processing content information expressing contents of processing to be executed by a flash device and identification information identifying the flash device, and that includes start information that is disposed in front of the valid data and indicates a start of the valid data, the flash device comprising a charge and discharge unit;

a control device that detects the processing content information received by the communication device and controls the flash device, wherein, after the control device has detected the start information, the control device outputs a signal to start charging to the flash device, and, if both an identification condition, which is that the identification information is included in the information to be processed that is received by the communication device, and an error condition, which is that errors are not detected from the error detection information, are satisfied, the control device outputs a signal to stop charging and a signal to start discharging to the flash device, and, if at least one of the identification condition and the error condition is not satisfied, the control device outputs the signal to stop charging to the flash device; and the flash device that performs charging and discharging in accordance with a signal output from the control device.

* * * * *